United States Patent
Natarajan et al.

(10) Patent No.: US 10,182,098 B2
(45) Date of Patent: Jan. 15, 2019

(54) METHOD AND SYSTEM FOR PROACTIVELY SELECTING A CONTENT DISTRIBUTION NETWORK (CDN) FOR DELIVERING CONTENT

(71) Applicant: Wipro Limited, Bangalore (IN)

(72) Inventors: Gowrishankar Subramaniam Natarajan, Chennai (IN); Jagan Mohan Gorti, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/458,100

(22) Filed: Mar. 14, 2017

(65) Prior Publication Data

US 2018/0219932 A1 Aug. 2, 2018

(30) Foreign Application Priority Data

Jan. 31, 2017 (IN) .............................. 201741003639

(51) Int. Cl.
*H04N 7/173* (2011.01)
*H04L 29/06* (2006.01)
*H04N 21/647* (2011.01)
*H04L 29/08* (2006.01)

(52) U.S. Cl.
CPC .......... *H04L 65/80* (2013.01); *H04L 65/4084* (2013.01); *H04L 67/18* (2013.01); *H04L 67/2847* (2013.01); *H04N 21/647* (2013.01); *H04N 21/64738* (2013.01)

(58) Field of Classification Search
CPC .... H04L 65/80; H04L 65/4069; H04N 21/647
See application file for complete search history.

(56) References Cited

U.S. PATENT DOCUMENTS

| | | | |
|---|---|---|---|
| 2004/0261135 A1* | 12/2004 | Cahnbley | H04N 21/23436 725/146 |
| 2013/0145400 A1* | 6/2013 | Chang | H04N 21/42203 725/53 |
| 2013/0339519 A1 | 12/2013 | Lientz | |
| 2014/0164584 A1* | 6/2014 | Joe | H04L 12/5689 709/223 |
| 2014/0331266 A1* | 11/2014 | Harrison | H04N 21/23106 725/98 |

(Continued)

FOREIGN PATENT DOCUMENTS

EP 2466498 A2 6/2016

*Primary Examiner* — Kyu Chae
(74) *Attorney, Agent, or Firm* — LeClairRyan PLLC (57) ABSTRACT

A technique is provided for proactively selecting a content distribution network (CDN) for delivering content. The technique includes determining one or more CDNs from a plurality of CDNs based on at least a plurality of quality of service (QoS) parameters of each of the plurality of CDNs. The streaming profiles of content streamed by the one or more CDNs is dynamically monitored based on at least a plurality of content streaming parameters. A plurality of geospatial parameters associated with the content to be delivered to a CDN selected from the determined one or more CDNs. Further, a CDN to which the content is to be delivered is selected, from the one or more CDNs. The selection is based on at least an analysis of the historic pattern of consumption of the content, the monitoring of the streaming profiles, and the retrieved plurality of geospatial parameters.

15 Claims, 4 Drawing Sheets

(56) References Cited

U.S. PATENT DOCUMENTS

| | | | |
|---|---|---|---|
| 2015/0264413 A1* | 9/2015 | Buehl | H04N 21/23113 |
| | | | 725/115 |
| 2015/0304196 A1* | 10/2015 | Sun | H04L 43/0876 |
| | | | 709/219 |
| 2017/0201571 A1* | 7/2017 | Sherf | H04L 67/1008 |

* cited by examiner

METHOD AND SYSTEM FOR PROACTIVELY SELECTING A CONTENT DISTRIBUTION NETWORK (CDN) FOR DELIVERING CONTENT

This application claims the benefit of Indian Patent Application Serial No. 201741003639, filed Jan. 31, 2017, which is hereby incorporated by reference in its entirety.

FIELD

This disclosure relates generally to content distribution networks (CDNs), and more particularly to system and method for proactively selecting a content distribution network for delivering content.

BACKGROUND

Advancements in the field of content distribution have led to development of various methods of delivering content using the Internet Protocol (IP). The content may include a live or on demand audio stream, a video stream, a multimedia content, and the like. Such content may be delivered from a Multimedia Video Programming Distributor (MPVD) using content distribution networks (CDNs).

In certain scenarios, when a lot of users attempt to access a content, such as a premium content or a new release of a Television series, there may be a lot of concurrent requests for such content from geographically diverse locations. Further, such requests may be received by the MPVD within a short amount of time. In such scenarios, the network of CDNs replicates the caches based on the increased number of user requests to access the content. However, such a replication of caches may result in degraded network performance and quality of service (QoS) parameters, such as delayed video starts, video start failures, and increased buffering time, and the like. In certain other scenarios, the content may be pushed to the last mile but such an operation may not be stochastic in nature and may not be customized to the users' requirements. This may lead also lead to reduced network performance and increased inefficiencies due to limited network resources. Furthermore, such a reduced performance may motivate the users to not access the content that may further lead to monetary losses for the content distributors.

It is therefore desirable to provide a mechanism for efficiently determining the demand of a particular content with respect to the requirements of the users and to ensure high QoS while delivering the content to the users.

SUMMARY

In one embodiment, a method of for proactively selecting a content distribution network (CDN) for delivering content is disclosed. In one example, the method comprises determining one or more CDNs from a plurality of CDNs based on at least a plurality of quality of service (QoS) parameters of each of the plurality of CDNs. The method further includes dynamically monitoring streaming profiles of content streamed by the one or more CDNs, based on at least a plurality of content streaming parameters. The method further includes retrieving a plurality of geospatial parameters associated with the content to be delivered to a CDN selected from the determined one or more CDNs. The method further includes selecting a CDN to which the content is to be delivered, from the one or more CDNs. The selection may be based on at least an analysis of the historic pattern of consumption of the content, the monitoring of the streaming profiles, and the retrieved plurality of geospatial parameters.

In another embodiment, a system is disclosed for proactively selecting a CDN for delivering content is disclosed. The system comprises a processor and a memory communicatively coupled to the processor. The memory stores processor-executable instructions, which, on execution, cause the processor to determine one or more CDNs from a plurality of CDNs based on at least a plurality of quality of service (QoS) parameters of each of the plurality of CDNs. The processor-executable instructions, on execution, further cause the processor to dynamically monitor streaming profiles of content streamed by the one or more CDNs, based on at least a plurality of content streaming parameters. The processor-executable instructions, on execution, further cause the processor to retrieve a plurality of geospatial parameters associated with the content to be delivered to a CDN selected from the determined one or more CDNs. The processor-executable instructions, on execution, further cause the processor to select a CDN to which the content is to be delivered, from the one or more CDNs. The selection may be based on at least an analysis of the historic pattern of consumption of the content, the monitoring of the streaming profiles, and the retrieved plurality of geospatial parameters.

In yet another embodiment, a non-transitory computer-readable medium storing computer-executable instructions for proactively selecting a CDN for delivering content is disclosed. In one example, the stored instructions, when executed by a processor, cause the processor to perform operations that include determining one or more CDNs from a plurality of CDNs based on at least a plurality of quality of service (QoS) parameters of each of the plurality of CDNs. The operations further include dynamically monitoring streaming profiles of content streamed by the one or more CDNs, based on at least a plurality of content streaming parameters. The operations further include retrieving a plurality of geospatial parameters associated with the content to be delivered to a CDN selected from the determined one or more CDNs. The operations further include selecting a CDN to which the content is to be delivered, from the one or more CDNs. The selection may be based on at least an analysis of the historic pattern of consumption of the content, the monitoring of the streaming profiles, and the retrieved plurality of geospatial parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
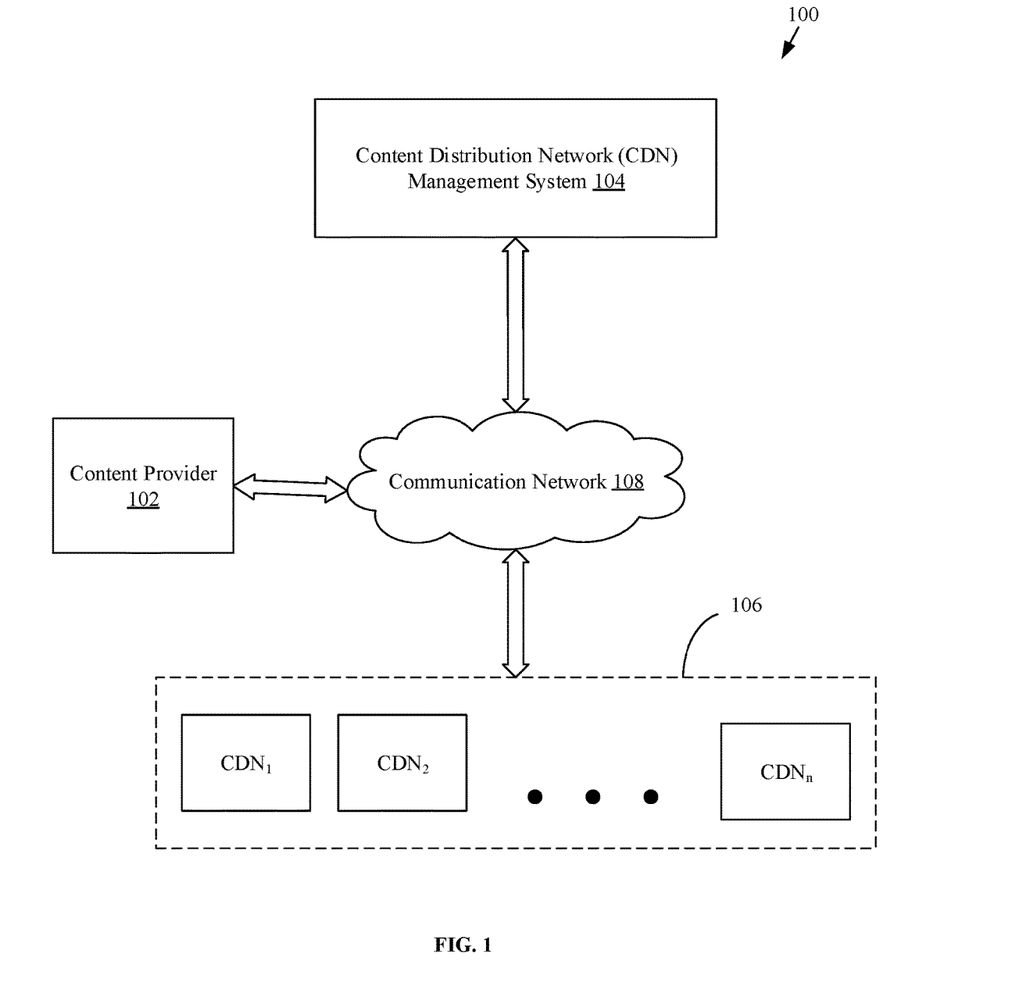
FIG. 1 is a block diagram of an exemplary network environment for proactively selecting a content distribution network (CDN) for delivering content, in accordance with some embodiments of the present disclosure.

Referring now to FIG. 1, an exemplary network environment 100 for proactively selecting a content distribution network (CDN) for delivering content is illustrated in accordance with some embodiments of the present disclosure. As will be described in greater detail in conjunction with FIG. 2, the network environment 100 displays a system for determining one or more CDNs from a plurality of CDNs based on at least a plurality of quality of service (QoS) parameters of each of the plurality of CDNs. The system may further dynamically monitor streaming profiles of content streamed by the one or more CDNs, based on at least a plurality of content streaming parameters. The system may further retrieve a plurality of geospatial parameters associated with the content to be delivered to a CDN selected from the determined one or more CDNs. The system may further select a CDN to which the content is to be delivered, from the one or more CDNs. In an embodiment, the system may select multiple CDNs from the one or more CDNs based on a priority list that may be based on content stream delivery business rules. The selection may be based on at least an analysis of the historic pattern of consumption of the content, the monitoring of the streaming profiles, and the retrieved plurality of geospatial parameters. In an embodiment, the selection may be further based on the plurality of QoS parameters associated with the one or more CDNs.

The network environment 100 includes a network of computing devices (e.g., a computer, a server, a digital device, a router, a modem, a bridge, a switch, etc.) for sending or receiving various data. In one embodiment, the network environment 100 includes a content provider 102, a content distribution network (CDN) management system 104, and a plurality of CDNs 106. The content provider 102, the content distribution network (CDN) management system 104, and the plurality of CDNs 106 may be in communication with each other over a wired or wireless communication network 108. Each of the computing devices further includes one or more processors and a computer-readable medium (e.g., a memory). The computer-readable storage medium stores instructions that, when executed by the one or more processors, cause the one or more processors to perform data reception and transmission in accordance with aspects of the present disclosure. The computer-readable storage medium may also store various data (e.g., optimal network path, optimal packet size, data packets, current packet size of a node, etc.) that may be captured, processed, and/or required by the network environment 100.

The content provider 102 may include suitable logic, circuitry, interfaces, and/or code for providing content to the plurality of users (not shown) associated with the plurality of CDNs 106. The content provider 102 may correspond to a Multichannel Video Programming Distributor (MPVD) that provides content requested by the plurality of users, via the plurality of CDNs 106. The content provided may include, but is not limited to, an audio stream, a video stream, a multimedia content. Further, the content provided may include, but is not limited to, a live video stream, an audio stream, a multimedia content stream. In an implementation, the content provider may include a Hyper Text Transfer Protocol (HTTP) origin module that corresponds to a starting point for initiating an Internet Protocol (IP) transfer of the content to the plurality of CDNs 106.

The CDN management system or computing device 104 may include suitable logic, circuitry, interfaces, and/or code for proactively selecting a content distribution network (CDN) for delivering content. In an implementation, the CDN management system 104 may include one or more modules for profiling the plurality of CDNs 106. The one or more modules of the CDN management system 104 may further monitor a content streamed by the plurality of CDNs 106. The one or more modules of the CDN management system 104 may further determining geospatial parameters associated with the content that is to be delivered to one or more CDN of the plurality of CDNs 106. The one or more modules of the CDN management system 104 may further select the one or more CDN from the plurality of CDNs 106 for delivering the content.

The plurality of CDNs 106 may include suitable logic, circuitry, interfaces, and/or code for rendering the content transmitted by the content provider 102, to the plurality of users. In an implementation, the plurality of CDNs 106 may include one or more modules at least for a Multi Bit Rate (MBR) transcoding, and just in time packaging and encryption. The plurality of CDNs 106 may receive the content from a Hyper Text Transfer Protocol (HTTP) origin module associated with the content provider.

The communication network 108 may include a medium through which the content provider 102, the CDN management system 104, and the plurality of CDNs 106 present in the network environment 100 may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In operation, the CDN management system 104 may perform a profiling of a plurality of Quality of Service (QoS) parameters of each of the plurality of CDNs 106. In an embodiment, the plurality of QoS parameters may include, but are not limited to, a re-buffering ratio, a video start failure rate, a lag ratio, an average bitrate, an error propagation rate, a video cache miss rate, a cache buffer rate, a cache replication ratio of caches across geographies, a buffer underrun. Based on the profiling, the CDN management system 104 may determine one or more CDNs from the plurality of CDNs 106.

The CDN management system 104 may perform a real-time (or a dynamic) monitoring of the streaming profiles of the content streamed by the determined one or more CDNs. The monitoring may be based on a plurality of content streaming parameters. In an embodiment, such plurality of content streaming parameters may include, but are not limited to, a manifest refresh rate, a frame rate of a streamed content, a frame error rate corresponding to a streamed content. The CDN management system 104 may further retrieve a plurality of geospatial parameters associated with the content that is to be delivered to a CDN selected from the one or more CDNs. In an embodiment, the plurality of geospatial parameters may include, but is not limited to, a geospatial distribution of content load, a demographic data, categories of devices and platforms to which the content is streamed, popularity of the content.

The CDN management system 104 may select a CDN to which the content is to be delivered, from the one or more CDNs. In an embodiment, the selection of the CDN may be based on an analysis of the historic pattern of consumption of the content. In an embodiment, the system may select multiple CDNs from the one or more CDNs based on a priority list that may be based on content stream delivery business rules. The selection of the CDN may be further based on an analysis of the monitoring of the streaming profiles, and the retrieved plurality of geospatial parameters. In an embodiment, the selection may be further based on the plurality of QoS parameters associated with the one or more CDNs. In an embodiment, the CDN management system 104 may further predict a load on the selected CDN based on the aforementioned analysis. Based on the selection of the CDN, the CDN management system 104 may populate a cache associated with the selected CDN.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the exemplary network environment 100 may transmit data over a communication network by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

Figure 2:
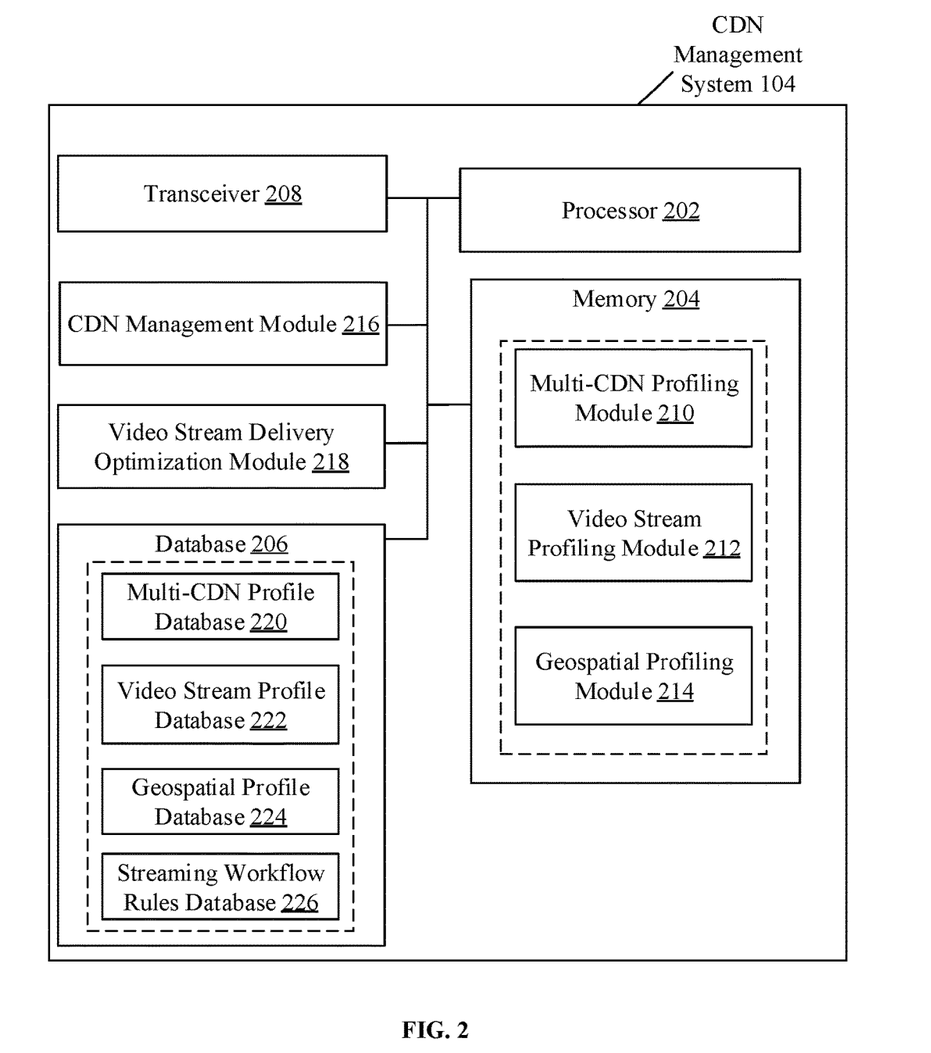
FIG. 2 is a block diagram of exemplary system for proactively selecting a CDN for delivering content, in accordance with some embodiments of the present disclosure.

FIG. 2 is a block diagram of exemplary system for proactively selecting a content distribution network (CDN) for delivering content, in accordance with some embodiments of the present disclosure. FIG. 2 is explained in conjunction with elements from FIG. 1. With reference to FIG. 2, there is shown the CDN management system 104. The CDN management system 104 may include one or more processors, such as a processor 202, a memory 204, a database 206, and/or a transceiver 208. The processor 202 may be communicatively coupled to a memory 204, the database 206, and/or the transceiver 208. In an embodiment, the CDN management system 104 may be communicatively coupled to the one or more remote devices, such as the content provider 102 and the plurality of CDNs 106 through the communication network 106, via the transceiver 208.

The processor 202 may include suitable logic, circuitry, interfaces, and/or code that may be configured to execute a set of instructions stored in the memory 204. The processor 202 may be configured for proactively select a content distribution network (CDN) from the plurality of CDNs 106 for delivering content by execution of one or more tracker algorithms, stored in the memory 204 of the electronic device. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may include suitable logic, circuitry, and/or interfaces that may be configured to store a machine code and/or a computer program with at least one code section executable by the processor 202. In an embodiment, the memory 204 may be configured to store a plurality of quality of service (QoS) parameters of each of the plurality of CDNs. The memory 204 may be further configured to store a plurality of content streaming parameters and/or a plurality of geospatial parameters. In an implementation, the memory 204 may include a plurality of modules for such as a multi-CDN profiling module 210, video stream profiling module 212, geospatial profiling module 214, CDN management module 216, and/or a video stream delivery optimization module 218. Examples of implementation of the memory 204 may include, but are not limited to, Random Access Memory (RAM), Read Only Memory (ROM), Hard Disk Drive (HDD), and/or a Secure Digital (SD) card.

The database 206 may include suitable logic, circuitry, and/or interfaces that may be configured to store a machine code and/or a computer program with at least one code section executable by the processor 202. The database may include a plurality of database 206 each of which may be required for storing specific parameters that enable the processor 202 to proactively selecting a content distribution network (CDN) for delivering content. In an implementation, the plurality of databases may include a multi-CDN profile database 220, a video stream profile database 222, a geospatial profile database 224, and/or a streaming workflow rules database 226. Examples of implementation of the database 206 and the plurality of database included therein may include, but are not limited to, relational databases, operational databases, a database warehouses, distributed databases, or an end-user databases, known in the art.

The transceiver 208 may include suitable logic, circuitry, interfaces, and/or code that may be configured to communicate with the content provider 102 and/or the plurality of CDNs 106, via a communication network 106. The transceiver 208 may implement known technologies to support wired or wireless communication. The transceiver 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long Term Evolution (LTE), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 in conjunction with the multi-CDN profiling module 210 may be configured to perform a profiling of a plurality of Quality of Service (QoS) parameters of each of the plurality of CDNs 106. Such a profiling may be performed in real-time and may include which stream profiles are being downloaded from an originating CDN at any point of time. Based on the performed profiling, the processor 202 may be configured to determine one or more CDNs to which a content may be streamed by the content provider 102.

In an embodiment, the processor 202 may be configured to store the plurality of QoS parameters in the multi-CDN profile database 220. In an embodiment, the plurality of QoS parameters may include, but are not limited to, a re-buffering ratio, a video start failure rate, a lag ratio, an average bitrate, an error propagation rate associated with a CDN, a video cache miss rate, a cache buffer rate, a cache replication ratio of caches across geographies, a buffer underrun.

The processor 202 in conjunction with the video stream profiling module 212 may be configured to perform a real-time monitoring of the streaming profiles of the content streamed by the determined one or more CDNs, based on a plurality of content streaming parameters. The stream profiles may correspond to a smooth streaming profile, a HTTP Dynamic Streaming (HDS) profile, an HTTP Live streaming (HLS) profile, a Dynamic Adaptive Streaming over HTTP (DASH) profile, a master manifest, and/or a variant bit rate playlist. In an embodiment, the stream profiles may further include information regarding a segment bit rate, Transport System (TS) overhead, a frame rate, one or more video formats that are served to the different CDNs at real time. In an embodiment, such plurality of content streaming parameters may include, but are not limited to, a manifest refresh rate, a frame rate of a streamed content, a frame error rate corresponding to a streamed content. In an embodiment, the data generated based on real-time monitoring of the video streaming profiles may be stored in the video stream profile database 222.

The processor 202 in conjunction with the geospatial profiling module 214 may be further configured to retrieve a plurality of geospatial parameters associated with the content that is to be delivered to a CDN selected from the one or more CDNs. The plurality of geospatial parameters may be retrieved from the geospatial profile database 224. In an embodiment, the plurality of geospatial parameters may correspond to historical patterns of consumption of various genres of content, peak viewing times for a specific content (or across various genres of content). The plurality of geospatial parameters may further correspond to a geospatial distribution of content load, or a content request ramp up rate across various geographical locations. The plurality of geospatial parameters may further correspond to content served across device platforms, device types and/or network access categories. The plurality of geospatial parameters further correspond to a duration for which a popular content is played back by the plurality of users during peak load conditions. The plurality of geospatial parameters further correspond to concurrent playback of a content by the plurality of users and/or exits before start of a content playback. A person of ordinary skill in the art will appreciate the plurality of geospatial parameters may further include one or more other parameters in addition to the aforesaid parameters.

In an embodiment, the geospatial profiling module 214 may be configured to communicate the retrieved plurality of geospatial parameters to the video stream delivery optimization module 218. Similarly, the video stream profiling module 212 may be configured to communicate the plurality of content streaming parameters to the video stream delivery optimization module 218. The processor 202 in conjunction with the video stream delivery optimization module 218 may be configured to analyze the received plurality of geospatial parameters (that may include historical pattern of consumption of content). The analysis may be further based on the monitoring of the streaming profiles of content streamed by the one or more CDNs, based on the plurality of content streaming parameters.

The processor 202 in conjunction with the CDN management module 216 may be configured to select a CDN from the one or more CDNs based on the aforementioned analysis. The selection of the CDN may be further based on a plurality of workflow rules that may be stored in the streaming workflow rules database 226. In an embodiment, the plurality of streaming workflow rules may be based on an originating CDN to an edge CDN latency of delivering a content. The plurality of streaming workflow rules may be further based on a re-buffering ratio on one or more CDNs. The plurality of streaming workflow rules may be further based on a Video Start Failure (VSF) associated with a CDN, a manifest refresh rate, a stream lag ratio corresponding to a requested content based on a manifest refresh rate on a CDN. The streaming workflow rules may be further based on a bit rate variant profiles corresponding to content downloaded maximum number of times from a CDN. A person of ordinary skill in the art will appreciate that the aforesaid workflow rules may be based on one or more other parameters, known in the art, relating to a CDN or a content streamed by a CDN. A person of ordinary skill in the art will appreciate that the aforesaid workflow rules may be dynamically updated in the streaming workflow rules database 226 by an administrator. In an embodiment, such an update may be performed automatically by the processor 202 based on the various parameters relating to the plurality of parameters relating to devices platform on which the content is served, in-home or out-of-home point of delivery of the content, type of network connection from which the content is streamed to the plurality of users, and the like.

In an embodiment, the processor 202 in conjunction with the CDN management module 216 may be configured to predict a load (or congestion) on the selected CDN based on the aforementioned analysis. In an embodiment, the prediction may be based on various artificial intelligence algorithms known in the art. Furthermore, the processor 202 in may be further configured to populate one or more caches associated with the selected CDN with the content that is to be delivered to the plurality of users. In an embodiment, the processor 202 may be further configured to provide a universal resource locator (URL) address of the selected CDN to the plurality of users, for streaming the content.

Figure 3:
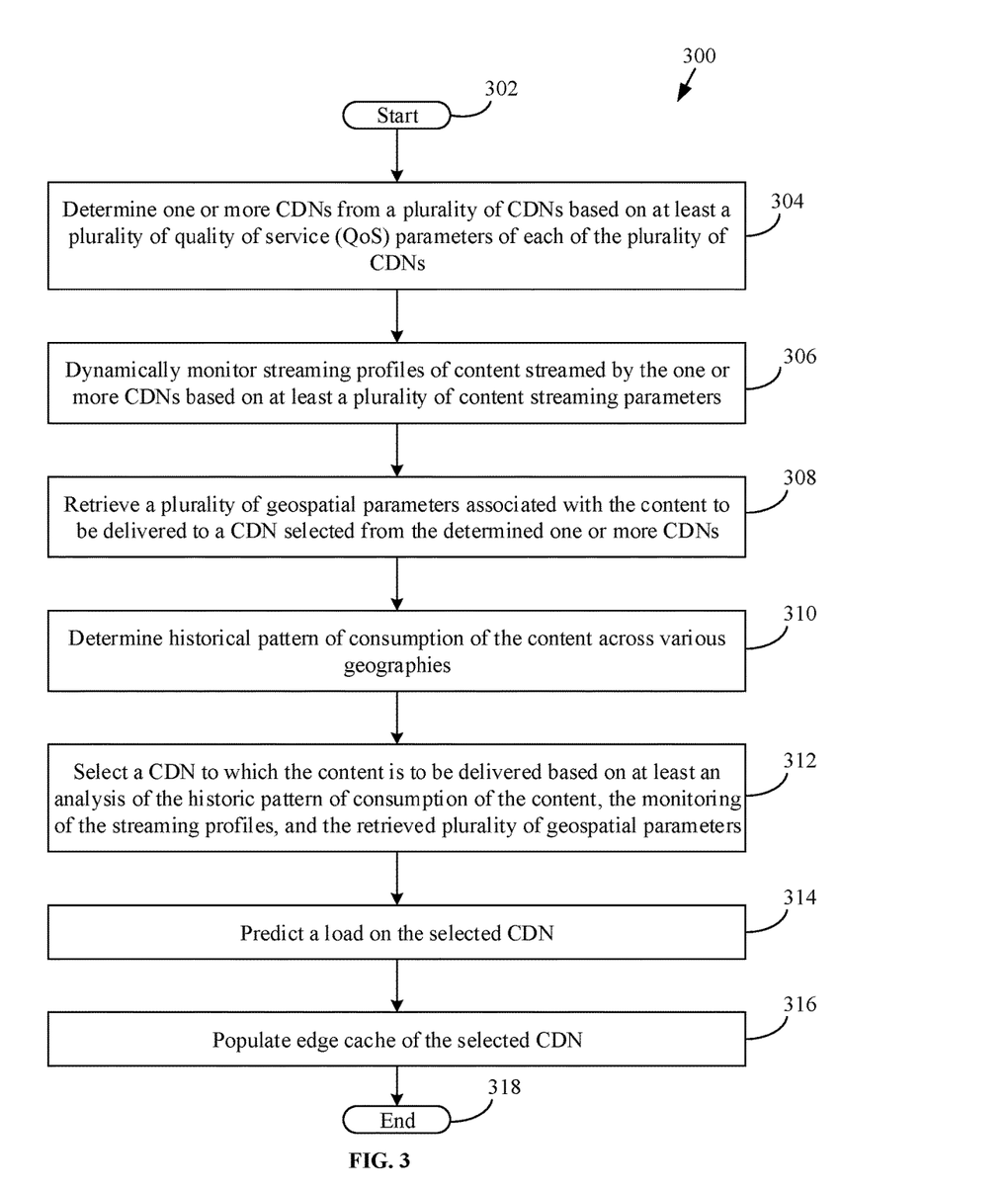
FIG. 3 is a flow diagram of a detailed exemplary process for proactively selecting a CDN for delivering content, in accordance with some embodiments of the present disclosure.

FIG. 3 is a flow diagram of a detailed exemplary process for proactively selecting a content distribution network (CDN) for delivering content, in accordance with some embodiments of the present disclosure. With reference to FIG. 3, there is shown a flow chart 300. The flow chart 300 is described in conjunction with FIGS. 1 and 2. The process starts at step 302 and proceeds to step 304.

At step 304, one or more CDNs from a plurality of CDNs may be determined, based on at least a plurality of quality of service (QoS) parameters of each of the plurality of CDNs. At step 306, streaming profiles of content streamed by the one or more CDNs may be dynamically monitored, based on at least a plurality of content streaming parameters. At step 308, a plurality of geospatial parameters associated with the content to be delivered to a CDN selected from the determined one or more CDNs, may be retrieved. At step 310, historical pattern of consumption of the content across various geographies may be determined. At step 312, a CDN to which the content is to be delivered, may be selected from the one or more CDNs. The selection of the CDN may be based on at least an analysis of the historic pattern of consumption of the content, the monitoring of the streaming profiles, and the retrieved plurality of geospatial parameters. At step 314, a load on the selected CDN may be predicted based on the analysis. At step 316, the content may be populated on the edge cache of the selected CDN. The control passes to end step 318.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
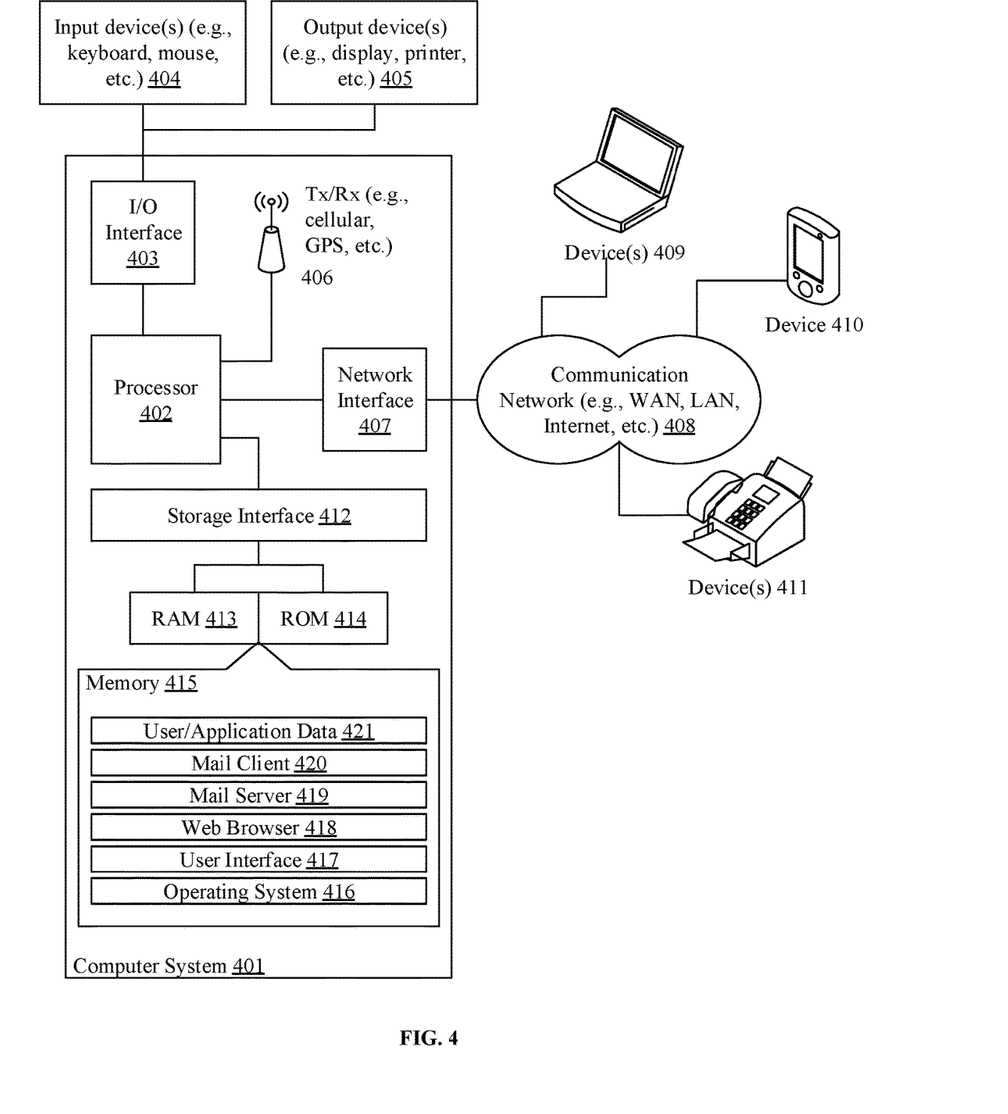
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing network environment 100 for transmitting data over a communication network. Computer system 401 may include a central processing unit ("CPU" or "processor") 402. Processor 402 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for proactively selecting a content distribution network (CDN) for delivering content, thereby assisting in pre-loading the edge caches associated with the CDNs. Such a pre-loading reduces chances of cache miss from occurring. Furthermore, the prediction of potential choke points in the content delivery and proactive copying of content to alternate CDN caches helps in improving CDN performance. The described technique also enables dynamic configuring of streaming workflow rules. Such a dynamicity in configuring the streaming workflow rules enables the system to provide a best suited CDN URL for content delivery.

The specification has described system and method for adapting a display on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for proactively selecting a content distribution network (CDN) for delivering content, the method comprising:
identifying, by a CDN management device, one or more CDNs from a plurality of CDNs based on at least a plurality of quality of service (QoS) parameters of each of the CDNs;
dynamically monitoring, by the CDN management device, one or more streaming profiles of content streamed by the identified one or more of the CDNs, based on a plurality of content streaming parameters, wherein the plurality of content streaming parameters comprise a manifest refresh rate, a frame rate of a streamed content, and a frame error rate corresponding to a streamed content;
retrieving, by the CDN management device, a plurality of geospatial parameters associated with the content to be delivered to one or more of the identified one or more of the CDNs, wherein the plurality of geospatial parameters corresponds to concurrent playback of the content by a plurality of users and a number of exits before start of the content playback; and
selecting, by the CDN management device, a CDN to which the content is to be delivered based on a priority list of the identified one or more CDNs and a plurality of bit rate variant profiles corresponding to content downloaded a pre-defined number of times from a CDN, wherein the priority list is based on one or more content stream delivery business rules, wherein the selection is further based on at least an analysis of the historic pattern of consumption of the content, the dynamic monitoring of the streaming profiles, and the retrieved plurality of geospatial parameters.

2. The method of claim 1, further comprising populating, by the CDN management device, a cache associated with the selected CDN to which the content is to be delivered based on the analysis.

3. The method of claim 1, further comprising predicting, by the CDN management device, a load on the selected CDN to which the content is to be delivered based on the analysis.

4. The method of claim 1, wherein the QoS parameters comprise one or more of a re-buffering ratio, a video start failure rate, a lag ratio, an average bitrate, an error propagation rate, a video cache miss rate, a cache buffer rate, a cache replication ratio of caches across geographies, or a buffer underrun.

5. The method of claim 1, wherein the geospatial parameters comprise one or more of a geospatial distribution of content load, a demographic data, one or more categories of devices or platforms to which the content is streamed, or a popularity of the content.

6. A content distribution network (CDN) management device, comprising:
a processor; and
a memory communicatively coupled to the processor, wherein the memory stores processor-executable instructions, which, on execution by the processor, causes the processor to:
identify one or more CDNs from a plurality of CDNs based on at least a plurality of quality of service (QoS) parameters of each of the CDNs;
dynamically monitor one or more streaming profiles of content streamed by the identified one or more of the CDNs, based on a plurality of content streaming parameters, wherein the plurality of content streaming parameters comprise a manifest refresh rate, a frame rate of a streamed content, and a frame error rate corresponding to a streamed content;
retrieve a plurality of geospatial parameters associated with the content to be delivered to one or more of the identified one or more of the CDNs, wherein the plurality of geospatial parameters corresponds to concurrent playback of the content by a plurality of users and a number of exits before start of the content playback; and
select a CDN to which the content is to be delivered based on a priority list of the identified one or more CDNs and a plurality of bit rate variant profiles corresponding to content downloaded a pre-defined number of times from a CDN, wherein the priority list is based on one or more content stream delivery business rules, wherein the selection is further based on at least an analysis of the historic pattern of consumption of the content, the dynamic monitoring of the streaming profiles, and the retrieved plurality of geospatial parameters.

7. The CDN management device of claim 6, wherein the processor executable instructions when executed by the processor further cause the processor to populate a cache associated with the selected CDN to which the content is to be delivered based on the analysis.

8. The CDN management device of claim 6, wherein the processor executable instructions when executed by the processor further cause the processor to predict a load on the selected CDN to which the content is to be delivered based on the analysis.

9. The CDN management device of claim 6, wherein the QoS parameters comprise one or more of a re-buffering ratio, a video start failure rate, a lag ratio, an average bitrate, an error propagation rate, a video cache miss rate, a cache buffer rate, a cache replication ratio of caches across geographies, or a buffer underrun.

10. The CDN management device of claim 6, wherein the geospatial parameters comprise one or more of a geospatial distribution of content load, a demographic data, one or more categories of devices or platforms to which the content is streamed, or a popularity of the content.

11. A non-transitory computer-readable medium comprising instructions for proactively selecting a content distribution network (CDN) for delivering content, wherein upon execution of the instructions by one or more processors, the processors perform operations comprising:
identifying one or more CDNs from a plurality of CDNs based on at least a plurality of quality of service (QoS) parameters of each of the CDNs;
dynamically monitoring one or more streaming profiles of content streamed by the identified one or more of the CDNs, based on a plurality of content streaming parameters, wherein the plurality of content streaming parameters comprise a manifest refresh rate, a frame rate of a streamed content, and a frame error rate corresponding to a streamed content;

retrieving a plurality of geospatial parameters associated with the content to be delivered to one or more of the identified one or more of the CDNs, wherein the plurality of geospatial parameters corresponds to concurrent playback of the content by a plurality of users and a number of exits before start of the content playback; and selecting a CDN to which the content is to be delivered based on a priority list of the identified one or more CDNs and a plurality of bit rate variant profiles corresponding to content downloaded a pre-defined number of times from a CDN, wherein the priority list is based on one or more content stream delivery business rules, wherein the selection is further based on at least an analysis of the historic pattern of consumption of the content, the dynamic monitoring of the streaming profiles, and the retrieved plurality of geospatial parameters.

12. The non-transitory computer-readable medium of claim 11, wherein upon execution of the instructions by the processors, the processors further perform operations comprising populating a cache associated with the selected CDN to which the content is to be delivered based on the analysis.

13. The non-transitory computer-readable medium of claim 11, wherein upon execution of the instructions by the processors, the processors further perform operations comprising predicting a load on the selected CDN to which the content is to be delivered based on the analysis.

14. The non-transitory computer-readable medium of claim 11, wherein the QoS parameters comprise one or more of a re-buffering ratio, a video start failure rate, a lag ratio, an average bitrate, an error propagation rate, a video cache miss rate, a cache buffer rate, a cache replication ratio of caches across geographies, or a buffer underrun.

15. The non-transitory computer-readable medium of claim 11, wherein the geospatial parameters comprise one or more of a geospatial distribution of content load, a demographic data, one or more categories of devices or platforms to which the content is streamed, or a popularity of the content.

* * * * *